United States Patent [19]

Miyoshi et al.

[11] Patent Number: 5,534,695
[45] Date of Patent: Jul. 9, 1996

[54] THERMAL IMAGE ANALYSIS SYSTEM

[75] Inventors: Tetsuo Miyoshi; Yuuji Hozumi; Akira Yamagishi; Kaoru Koizumi, all of Kamakura, Japan

[73] Assignee: Mitsubishi Denki Kabushiki Kaisha, Tokyo, Japan

[21] Appl. No.: 327,973

[22] Filed: Oct. 24, 1994

[30] Foreign Application Priority Data

Oct. 29, 1993 [JP] Japan ................................. 5-272085

[51] Int. Cl.⁶ ................................................. G01J 5/48
[52] U.S. Cl. ......................................... 250/330; 250/252.1
[58] Field of Search ...................... 250/252.1 A, 252.1 R, 250/330, 332; 374/124

[56] References Cited

U.S. PATENT DOCUMENTS

| | | | |
|---|---|---|---|
| 3,430,045 | 2/1969 | Biork et al. | |
| 3,798,366 | 3/1974 | Hunt et al. | |
| 5,032,727 | 7/1991 | Cox, Jr. et al. | 250/332 X |
| 5,101,271 | 3/1992 | Andrews et al. | 250/252.1 X |
| 5,118,943 | 6/1992 | Le Bars et al. | 250/252.1 X |
| 5,134,474 | 7/1992 | Hanafusa et al. | 250/332 X |

FOREIGN PATENT DOCUMENTS

| | | |
|---|---|---|
| 58-120136 | 7/1983 | Japan . |
| 58-191937 | 11/1983 | Japan . |
| 59-67431 | 4/1984 | Japan . |
| 59-114423 | 7/1984 | Japan . |
| 3-120431 | 5/1991 | Japan . |
| 5-26734 | 2/1993 | Japan . |
| 2079562 | 1/1982 | United Kingdom . |

Primary Examiner—Carolyn E. Fields
Assistant Examiner—Edward J. Glick
Attorney, Agent, or Firm—Wolf, Greenfield & Sacks

[57] ABSTRACT

A thermal image analysis system 1 includes a reference signal generating circuit 10 for generating two or more reference signals, an image synthesizing circuit 11 for combining an image outputted from an image output circuit 9 with the reference signals, a reference signal sensing circuit 13 for sensing the reference signals from an image signal inputted into an image input circuit 8, a numerical input circuit 12 for inputting temperature information corresponding to the reference signals and a compensation circuit 14 for compensating the image signal, based on the temperature information and reference signals. The reference signal generating circuit 10 generates reference signals of two or more levels. The reference signal sensing circuit 13 senses the reference signals from an image signal reproduced by an image recording/reproducing system 2. The compensation circuit 14 compensates the reproduced image signal to the state similar to that of the image signal before being recorded, based on the temperature information inputted from the numerical input circuit 12. Such a thermal image analysis system 1 can compensate the image signal degraded or changed through the image recording/reproducing system 2 to improve the accuracy in thermal image analysis.

26 Claims, 12 Drawing Sheets

THERMAL IMAGE ANALYSIS SYSTEM

BACKGROUND OF THE INVENTION

1. Field of the Invention

The present invention relates to a thermal image analysis system for analyzing the temperature on the surface of a subject by taking an infrared image of the surface of the subject through a combination of an optical system and an image sensor and processing the information of the taken image. The present invention particularly concerns such a thermal image analysis system having a function of performing the thermal image analysis with respect to the information of an image reproduced after the image information outputted from the thermal image analysis system has been recorded in an image recording/reproducing apparatus.

2. Description of the Prior Art

Figure 13:
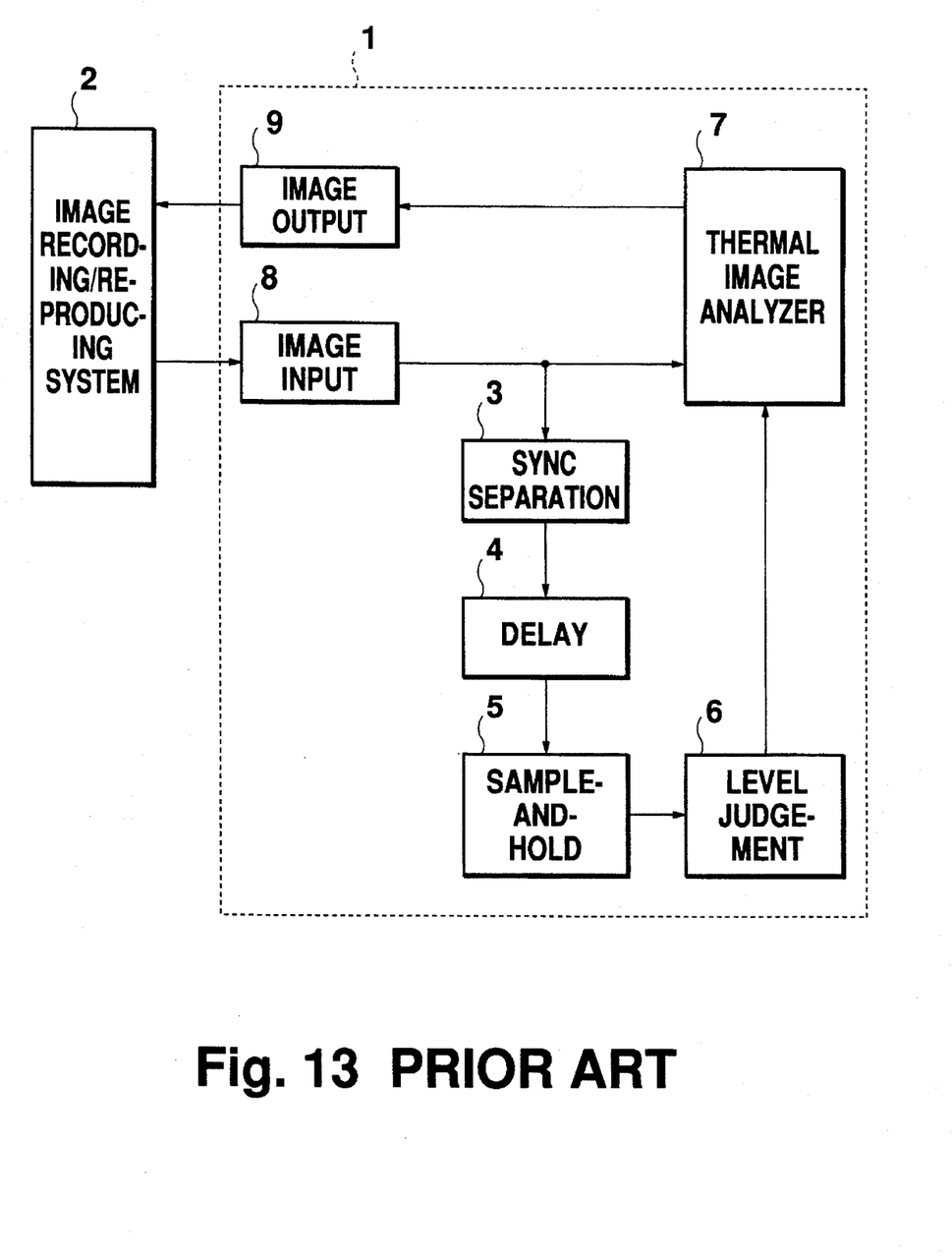
FIG. 13 is a block diagram of a thermal image analysis system constructed in accordance with the prior art.

FIG. 13 exemplifies a thermal image analysis system constructed in accordance with the prior art, as disclosed in Japanese Patent Laid-Open No. Sho 58-120136. In FIG. 13, reference numeral 1 denotes a thermal image analysis system; and 2 an image recording/reproducing system. The thermal image analysis system 1 comprises a sync separation circuit 3, a delay circuit 4, a sample-and-hold circuit 5, a level judgment circuit 6, a thermal image analyzing unit 7, an image input circuit 8 and an image output circuit 9.

The analysis of the thermal image analysis system 1 will be described below.

Figure 14A:
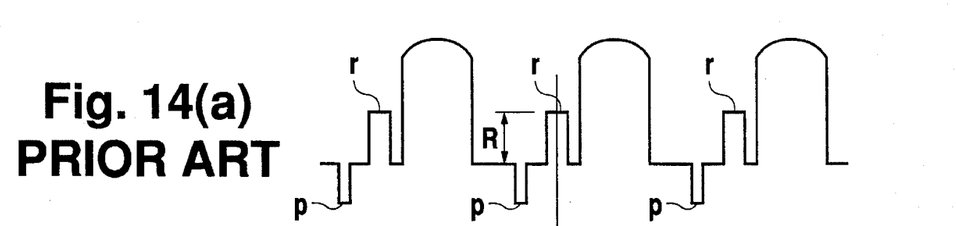
FIGS. 14(a) to (d) are waveforms illustrating the operation of the thermal image analysis system of the prior art shown in FIG. 13.

FIG. 14(a) shows a waveform of an image output signal from the thermal image analysis system 1 to the image recording/reproducing system 2. Sync signal parts are designated by symbol p while absolute temperature signal parts inserted to measure absolute temperatures are indicated by symbol r. The signal level R at each of the signal parts r is variable depending on the range of temperature in the thermal image analysis system 1 and will be recorded in the image recording/reproducing system 2 with the information of thermal image when an image signal is outputted from the image output circuit 9 and recorded in the image recording/reproducing system 2.

Figure 14B:
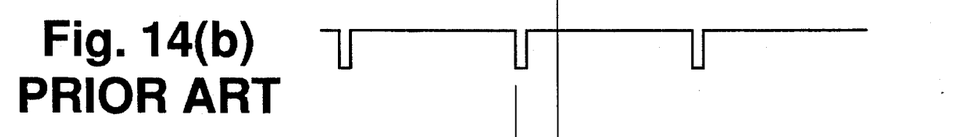
Figure 14C:
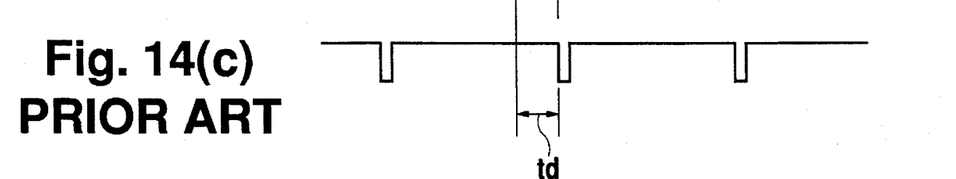

As the image signal is reproduced by the image recording/reproducing system 2, the signal level R is also reproduced with the thermal image information in the same form as shown in FIG. 14(a). In the thermal image analysis system 1, the sync separation circuit 3 only fetches such sync signal parts as shown in FIG. 14(b) from the image signal shown in FIG. 14(a). The delay circuit 4 retards the fetched sync signal parts by a given time $t_d$ to form such a signal as shown in FIG. 14(c).

Figure 14D:
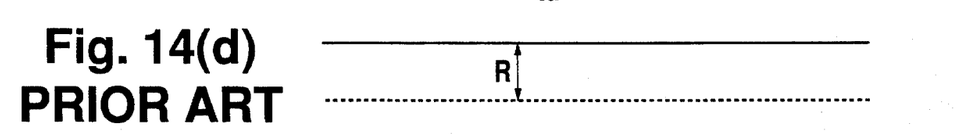

The delay circuit 4 is set so that the delayed sync signal parts are located at positions corresponding to the respective absolute temperature signal parts r. The sample-and-hold circuit 5 samples and holds the image signal shown in FIG. 14(a) at the sync signal parts shown in FIG. 14(c) to provide an invariable signal having its level equal to the signal level R in the absolute temperature signal parts r, as shown in FIG. 14(d). As a result, the level judgment circuit 6 can easily know the range of measured temperature in the thermal image analysis system 1 when the image signal is recorded in the image recording/reproducing system 2.

The thermal image analysis system 1 is manually or automatically set on the thus judged range of measured temperature such that the thermal image analysis can be carried out under the same condition as that of the recording step.

In such an arrangement, however, DC components will be superimposed on the image signal or the dynamic range will be undesirably changed when the reproduction is carried out after the recording in the image recording/reproducing system 2. In other words, the signal level R may be changed so that a correct judgment will not be made from only a single signal level. This tends to cause incorrect judgment. Thus, the thermal image analysis system 1 of the prior art shown in FIG. 13 can at most recognize several steps in the range of measurement through judgment from the signal level R. It is impossible for the range of measured temperature to be finely regulated and set in the image recording/reproducing system 2 before re-measurement.

It is therefore an object of the present invention to provide a thermal image analysis system which can compensate for any degradation or variations in an image signal due to the image recording/reproducing system and improve the accuracy of the thermal image analysis.

SUMMARY OF THE INVENTION

According to one aspect of the present invention, it provides a thermal image analysis system comprising a reference signal generating circuit for generating two or more reference signals, an image synthesizing circuit for combining an image from an image output circuit with said reference signals, a reference signal sensing circuit for sensing said reference signals from an image signal inputted into an image input circuit, a numerical input circuit for receiving temperature information corresponding to said reference signals, and a compensation circuit for compensating said image signal, based on said temperature information and reference signals. The reference signal generating circuit generates reference signals of two or more levels which provide standards. The reference signal sensing circuit senses the reference signals from an image signal reproduced by an image recording/reproducing system. The compensation circuit compensates the reproduced image signal to put it in the same state as that of the image signal before being recorded, based on the temperature information inputted from the numerical input circuit.

According to the second aspect of the present invention, it provides a thermal image analysis system comprising a reference image generating circuit for generating two or more reference images, an image switching circuit for selectively outputting an image from an image output circuit or said reference images, a reference image cutting circuit for sensing said reference images from an image signal, a numerical input circuit for inputting temperature information corresponding to said reference images, and a compensation circuit for compensating said image signal, based on said temperature information and image signal. The reference image generating circuit generates reference images of two or more levels which are used as standards. The reference image cutting circuit cuts said reference images from the image signal reproduced by the image recording/reproducing system. The compensation circuit compensates the reproduced image signal so that it is in the same state as that of the image signal before recorded, based on the temperature information inputted from the numerical input circuit.

According to third aspect of the present invention, it provides a thermal image analysis system comprising a reference image generating circuit, a display character generating circuit for generating a character image representing temperature information corresponding to said reference images, an image synthesizing circuit for combining said character image with said reference images, an image switching circuit for selectively outputting an image from an image output circuit or an image from said image synthesizing circuit, a reference area cutting circuit for cutting said reference images from an image signal inputted into an image input circuit, a numeric input circuit for inputting temperature information corresponding to said reference images, and a compensation circuit for compensating the image signal inputted into the image input circuit, based on said temperature information and the reference images cut by said reference image cutting circuit. The display character generating circuit generates a display character representing the temperature information to be inputted by the numerical input circuit.

According to the fourth aspect of the present invention, it provides a thermal image analysis system comprising a reference image generating circuit, a bar code generating circuit for generating bar code images representing temperature information corresponding to said reference images, an image synthesizing circuit for combining said bar code images with said reference images, an image switching circuit for selectively outputting an image from an image output circuit or an image from said image synthesizing circuit, a reference area cutting circuit for cutting said reference images from an image signal inputted into an image input circuit, a bar code reading circuit for sensing the bar codes from an image signal inputted from an image input circuit, and a compensation circuit for compensating the image signal inputted into the image input circuit, based on said temperature information read out by said bar code reading circuit and the reference images cut by said reference image cutting circuit. The bar code generating and reading circuits enable the input of temperature information to be automated.

According to the fifth aspect of the present invention, it provides a thermal image analysis system comprising a reference signal generating circuit, a temperature information generating circuit for coding temperature information corresponding to said reference signals, an image synthesizing circuit for combining an image from an image output circuit with the reference signals and the temperature information generated by said temperature information generating circuit, a reference signal sensing circuit for sensing said reference signals from an image signal inputted to an image input circuit, a temperature information reading circuit for reading the temperature information from the image signal inputted into said image input circuit, and a compensation circuit for compensating the image signal inputted into said image input circuit, based on the temperature information read out by said temperature information reading circuit and the reference signals sensed by said reference signal sensing circuit. The temperature information generating and reading circuits enable the input of temperature information to be automated.

According to the sixth aspect of the present invention, it provides a thermal image analysis system comprising a reference signal generating circuit, an image synthesizing circuit for combining an image from an image output circuit with the reference signals, a reference signal sensing circuit for sensing the reference signal from an image signal inputted to an image input circuit, and an AGC circuit for equalizing the scale of the image signal inputted to the image input circuit, based on the reference signals sensed by the reference signal sensing circuit. The AGC circuit can eliminate the input of temperature information.

DETAILED DESCRIPTION OF THE PREFERRED EMBODIMENTS

Embodiment 1

Figure 1:
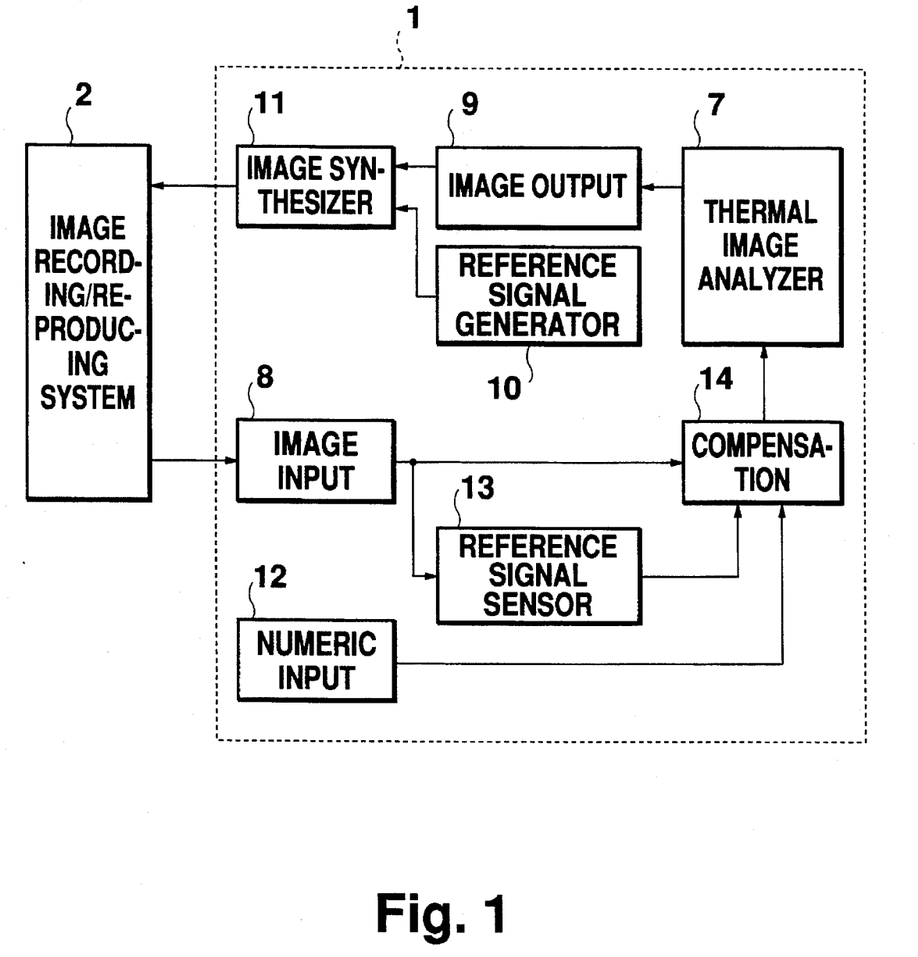
FIG. 1 is a block diagram of the first embodiment of a thermal image analysis system constructed in accordance with the present invention.

FIG. 1 shows a thermal image analysis system 1 according to the first embodiment of the present invention and an image recording/reproducing system 2. The thermal image analysis system 1 comprises a thermal image analyzing unit 7, an image input circuit 8, an image output circuit 9, a reference signal generating circuit 10, an image synthesizing circuit 11, a numerical input circuit 12, a reference signal sensing circuit 13 and a compensation circuit 14.

The operation of the thermal image analysis system 1 will be described below.

Figure 2A:
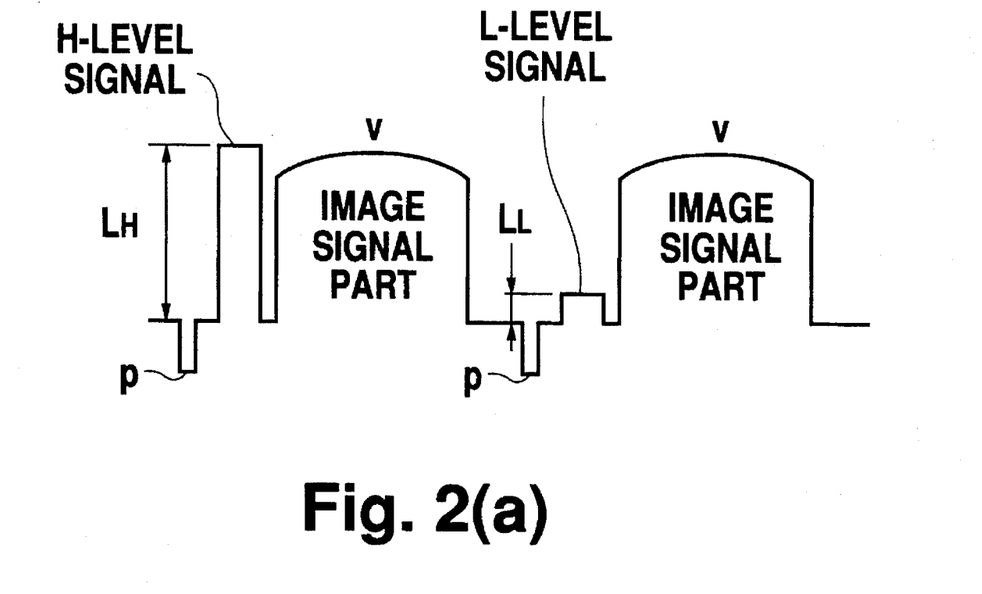
FIGS. 2(a) and (b) are waveforms illustrating the operation of the thermal image analysis system shown in FIG. 1.

First of all, the reference signal generating circuit 10 generates reference signal of two levels, a reference signal of level $L_H$ and a reference signal of level $L_L$. These two reference signals are inputted into the image synthesizing circuit 11 with a thermal image signal outputted from the image output circuit 9. The image synthesizing circuit 11 combines these signals to form such a waveform as shown in FIG. 2(a) wherein the reference signals are inserted into no-signal parts between sync signal parts p and image signal parts v. In this embodiment, the reference signals of levels $L_H$ and $L_L$ generated by the reference signal generating circuit 10 are alternately inserted for every image signal field.

The image signal containing the reference signals inserted into the no-signal parts between the sync signal parts p and the image signal parts v is recorded and then reproduced by the image recording/reproducing system 2. The reproduced image signal is inputted into the reference signal sensing circuit 13 through the image input circuit 8. The reference signal sensing circuit 13 provides the reference signals of levels $L_H$ and $L_L$ to the compensation circuit 14, these reference signals being separated from the reference signals inserted into the image signal as in the thermal image analysis system 1 of the prior art shown in FIG. 13. The reference signals of levels $L_H$ and $L_L$, as well as image signal, are not necessarily equal to the original signal level when they are recorded and reproduced by the image recording/reproducing system 2. Therefore, the numerical input circuit 12 provides image levels corresponding to the reference signals of levels $L_H$ and $L_L$ to the compensation circuit 14 wherein the image signal outputted from the image input circuit 8 is returned to the same level as is outputted toward the image recording/reproducing system 2.

Although the bias or gain applied to the signal level may be changed in the image recording/reproducing system 2, it will not be substantially changed in a non-linear fashion. If two-point compensation is carried out according to this embodiment, the signal level can substantially perfectly be replicated with the original level.

Figure 2B:
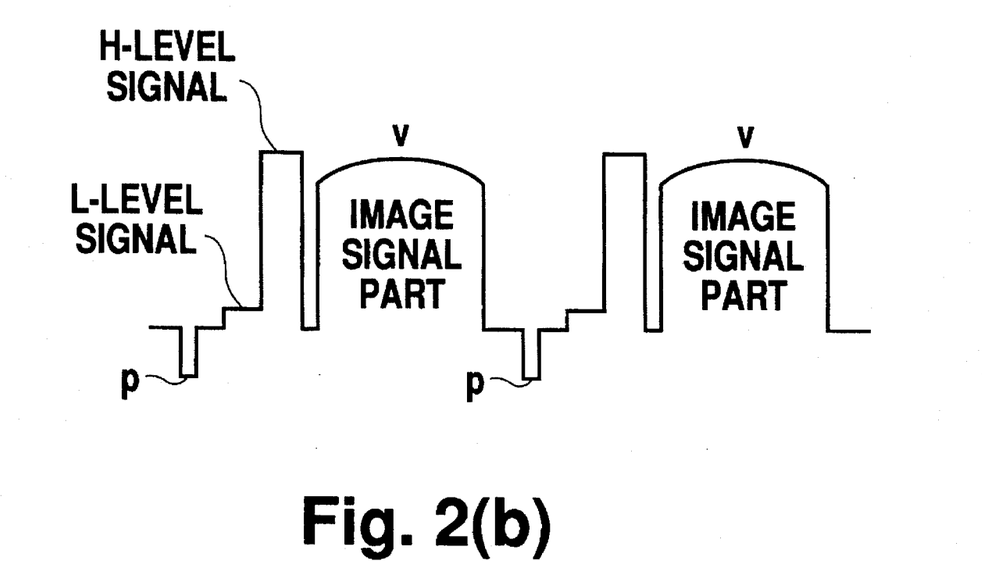

Further, the thermal image analysis system 1 of this embodiment can insert two reference signals of levels $L_H$ and $L_L$ into the same field in a no-signal part between a sync signal part p and an image signal part v, as shown in FIG. 2(b).

In addition, the thermal image analysis system 1 of this embodiment can use three or more reference signals which are continuously or discontinuously variable. Particularly when continuously variable reference signals are used, the thermal image analysis system 1 can accurately compensate the image signal, even if the reference signals are non-linearly changed by the image recording/reproducing system 2.

Embodiment 2

Figure 3:
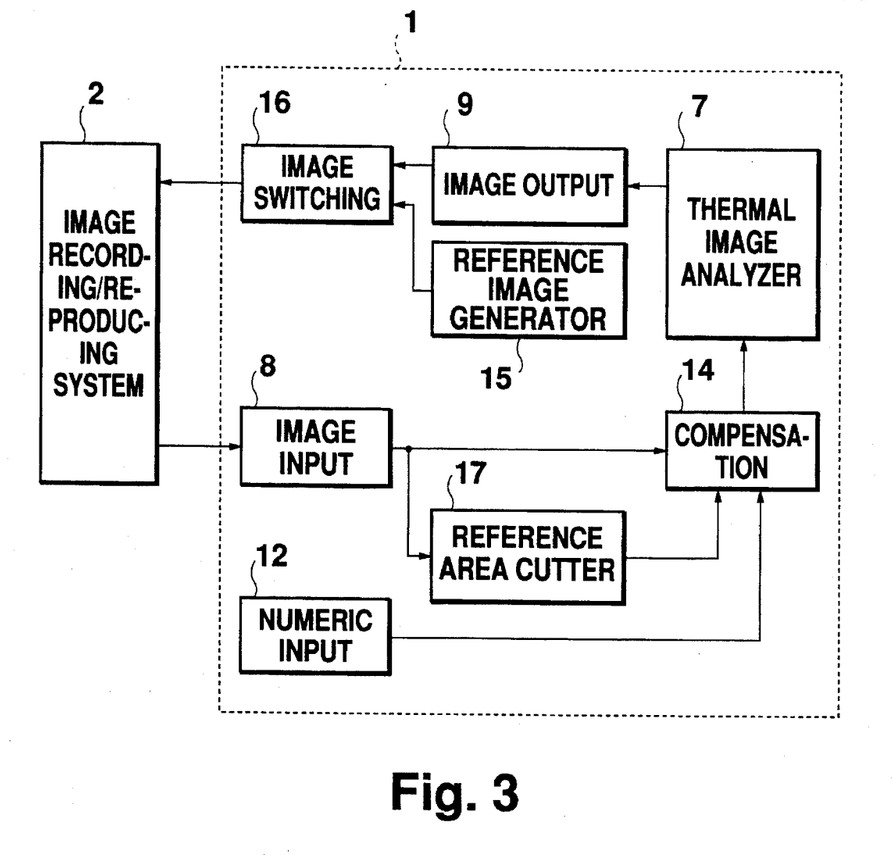
FIG. 3 is a block diagram of the second embodiment of a thermal image analysis system constructed in accordance with the present invention.
Figure 4:
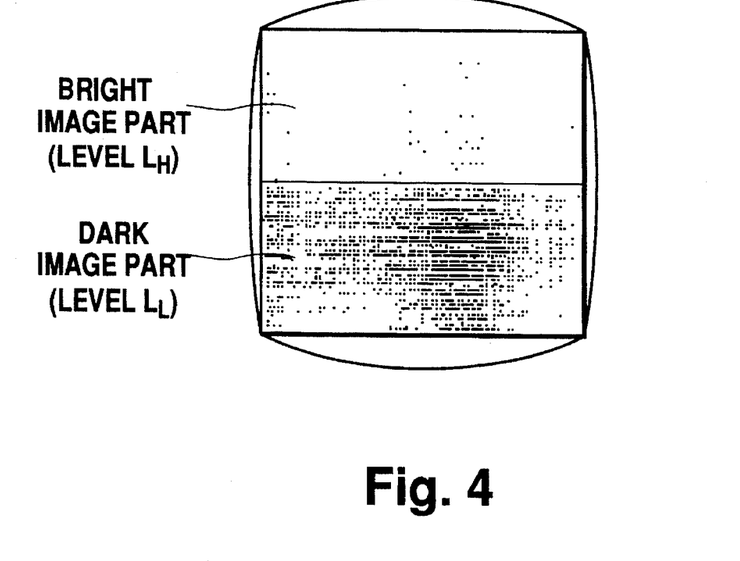
FIG. 4 is a view showing a scene for illustrating the operation of the thermal image analysis system shown in FIG. 3.

FIG. 3 shows a thermal image analysis system 1 constructed according to the second embodiment of the present invention and a image recording/reproducing system 2. The thermal image analysis system 2 of this embodiment comprises a reference image generating circuit 15 in place of the reference signal generating circuit 10, an image switching circuit 16 in place of the image synthesizing circuit 11, and a reference area cutting circuit 17 in place of the reference signal sensing circuit 13. The reference image generating circuit 15 may generate a reference image consisting of a bright image portion of level $L_H$ and a dark image portion $L_L$, as shown in FIG. 4. The image switching circuit 16 switches between a thermal image outputted from the image output circuit 9 and the reference image. The switching may be carried out manually by an operator when the thermal image is to be recorded, or be performed automatically by the thermal image analysis system 1 itself for a given time period when the recording is started.

The operation of the thermal image analysis system 1 will be described below.

When the thermal image analysis system 1 reproduces an image after it has been recorded in the image recording/reproducing system 2, the operator inputs temperature values corresponding to levels $L_H$ and $L_L$ through the numerical input circuit 12 just as the reference image is reproduced. By this timing of temperature value input, the reference area cutting circuit 17 cuts parts of the respective bright and dark image portions from the reference image to sense the levels $L_H$ and $L_L$. At the same time, the levels $L_H$ and $L_L$ are outputted toward the compensation circuit 14. The compensation circuit 14 compensates a reproduced image, based on the inputted levels $L_H$ and $L_L$ and the temperature values inputted from the numeric input circuit 12.

As in the thermal image analysis system 1 of the first embodiment, the thermal image analysis system 1 of the second embodiment can substantially perfectly replicate the image signal with the original level if two-point compensation is carried out. The thermal image analysis system 1 of the second embodiment is particularly effective if sufficient time required to insert the reference signals into the no-signal parts between the sync signal parts p and the image signal parts v cannot be secured.

The thermal image analysis system 1 of the second embodiment can use three or more reference images containing bright, dark and intermediate image portions which are continuously variable in brightness. Particularly when the reference image used is continuously variable in brightness, the thermal image analysis system 1 can accurately compensate the image signal even if the reference image is non-linearly changed by the image recording/reproducing system 2.

Embodiment 3

Figure 5:
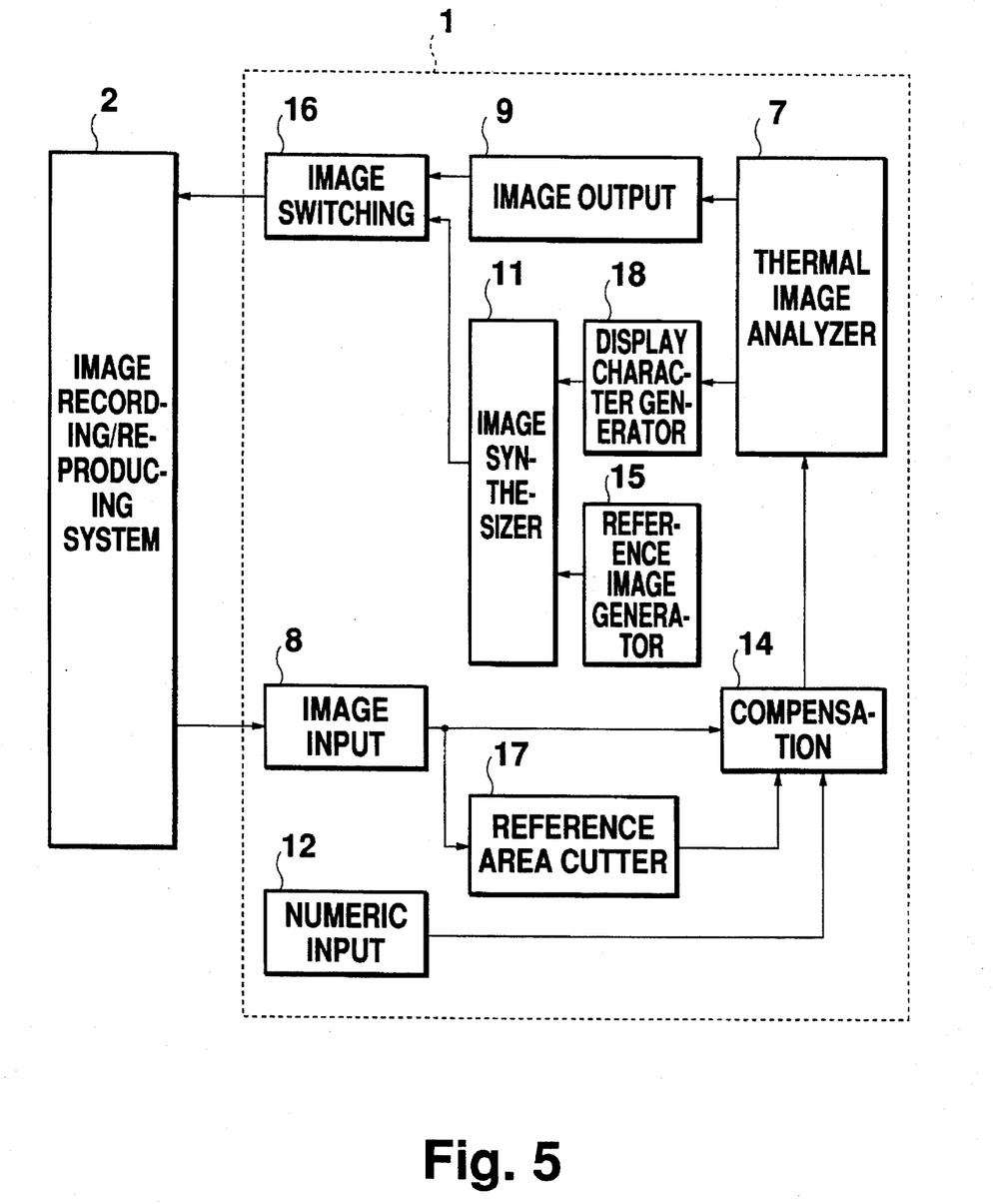
FIG. 5 is a block diagram of the third embodiment of a thermal image analysis system constructed in accordance with the present invention.
Figure 6:
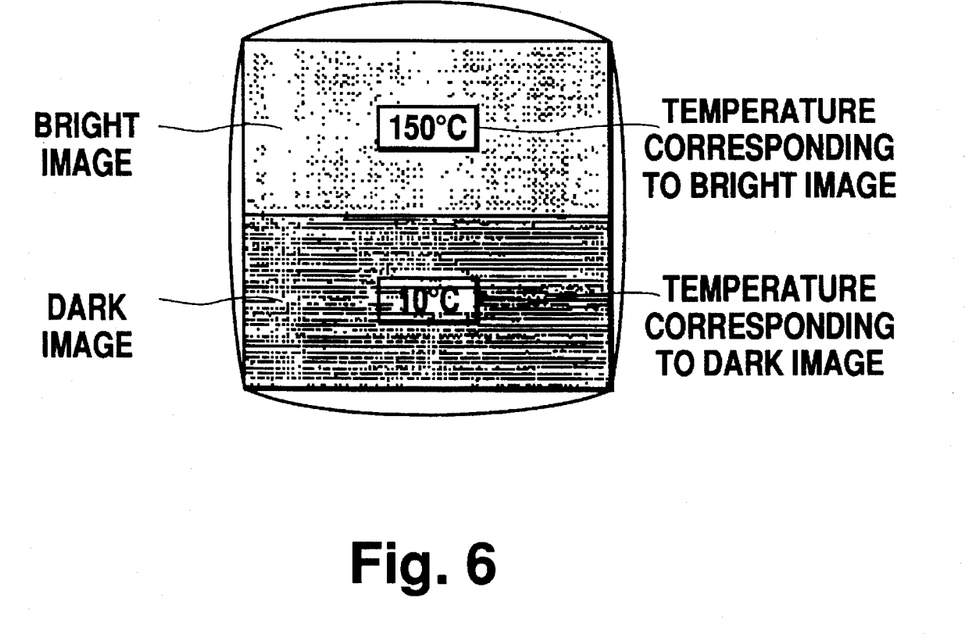
FIG. 6 is a view showing a scene for illustrating the operation of the thermal image analysis system shown in FIG. 5.

FIG. 5 shows a thermal image analysis system 1 constructed according to the third embodiment of the present invention and a image recording/reproducing system 2. The thermal image analysis system 1 comprises a display character generating circuit 18 and an image synthesizing circuit 11 in addition to the same structure as in the second embodiment. The display character generating circuit 18 generates a character image representing temperature information corresponding to bright and dark images. The image synthesizing circuit 11 combines a character image outputted from the display character generating circuit 18 with a reference image outputted from the reference image generating circuit 15. In other words, the thermal image analysis system 1 superimposes the character image on the reference image, as shown in FIG. 6.

The thermal image analysis system 1 of the third embodiment does not require for the operator to learn temperature values for compensation which should be inputted on image reproduction. The operator can input the temperature values while viewing the temperature values (character images) indicated on the display.

Embodiment 4

Figure 7:
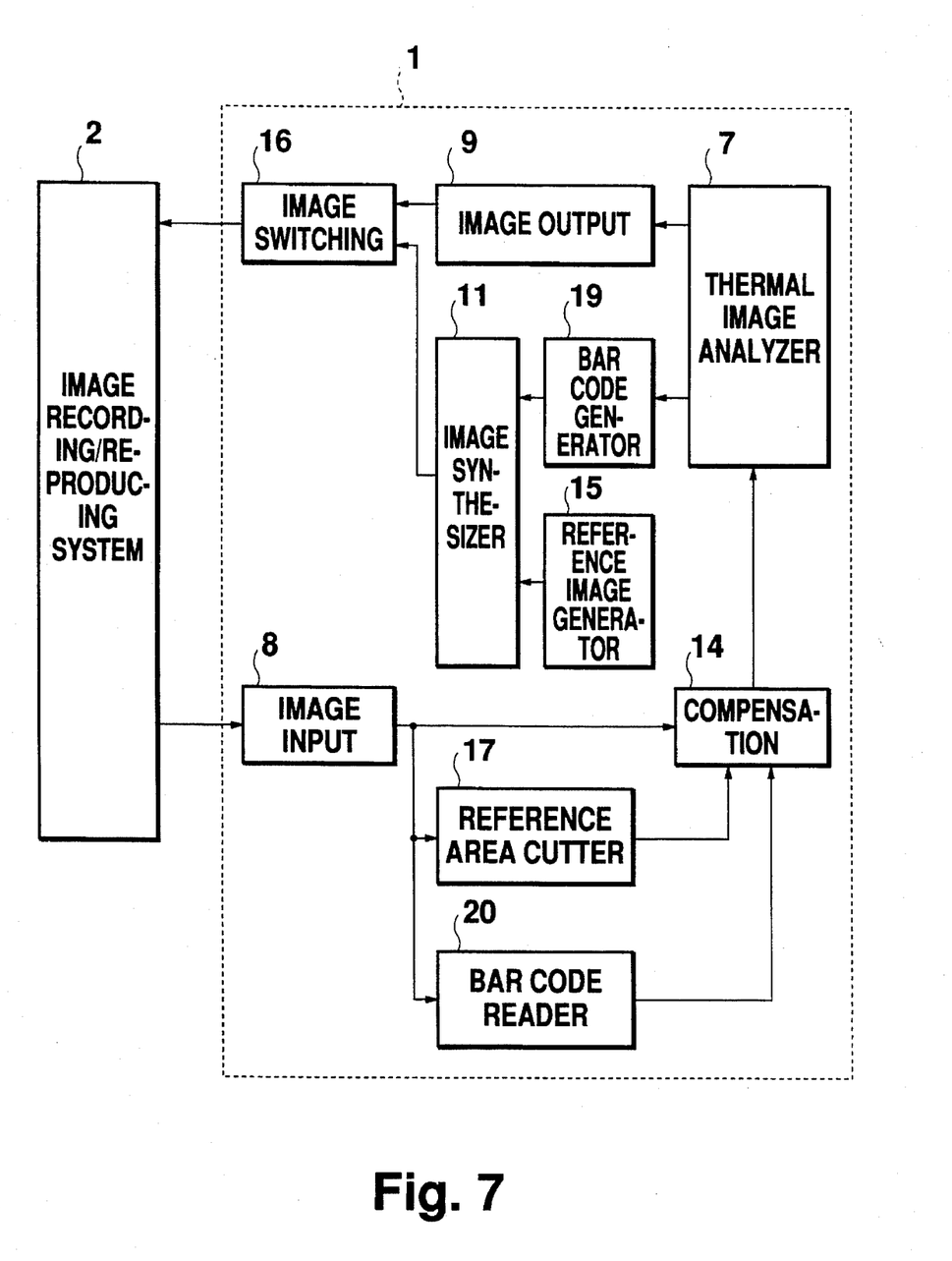
FIG. 7 is a block diagram of the fourth embodiment of a thermal image analysis system constructed in accordance with the present invention.
Figure 8:
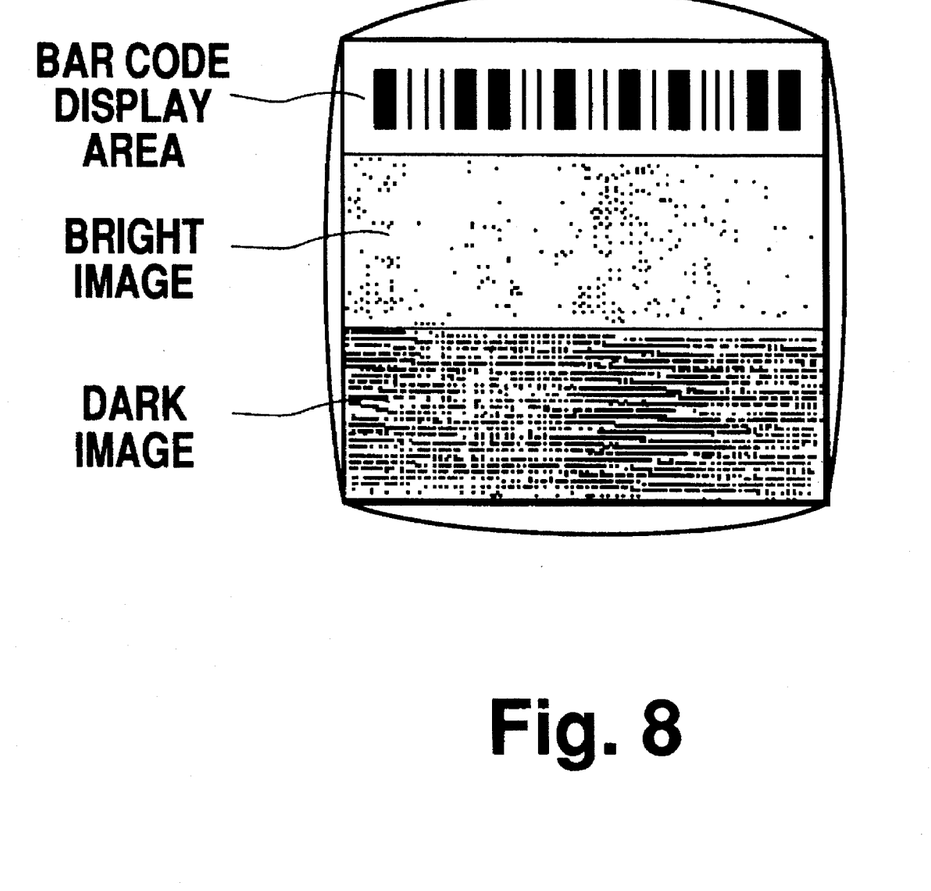
FIG. 8 is a view showing a scene for illustrating the operation of the thermal image analysis system shown in FIG. 7.

FIG. 7 shows a thermal image analysis system 1 constructed according to the fourth embodiment of the present invention and a image recording/reproducing system 2. The thermal image analysis system 1 comprises a bar code generating circuit 19 in place of the display character generating circuit 18 and an additional bar code reading circuit 20. The numeric input circuit 12 is omitted. The bar code generating circuit 19 generates temperature information corresponding to bright and dark images. The image synthesizing circuit 11 combines the temperature information outputted from the bar code generating circuit 19 with the reference image outputted from the reference image generating circuit 15. As shown in FIG. 8, the bar code is superimposed and displayed on a given area on the reference image, for example, on the uppermost area thereof. The bar code reading circuit 20 reads the bar code indicated on a given area in the reproduced image. The read temperature information is then outputted to the compensation circuit 14.

The thermal image analysis system 1 of the fourth embodiment can automatically read the temperature information from the recorded and reproduced image and perform the compensation since it comprises the bar code generating circuit 19 and the bar code reading circuit 20.

Embodiment 5

Figure 9:
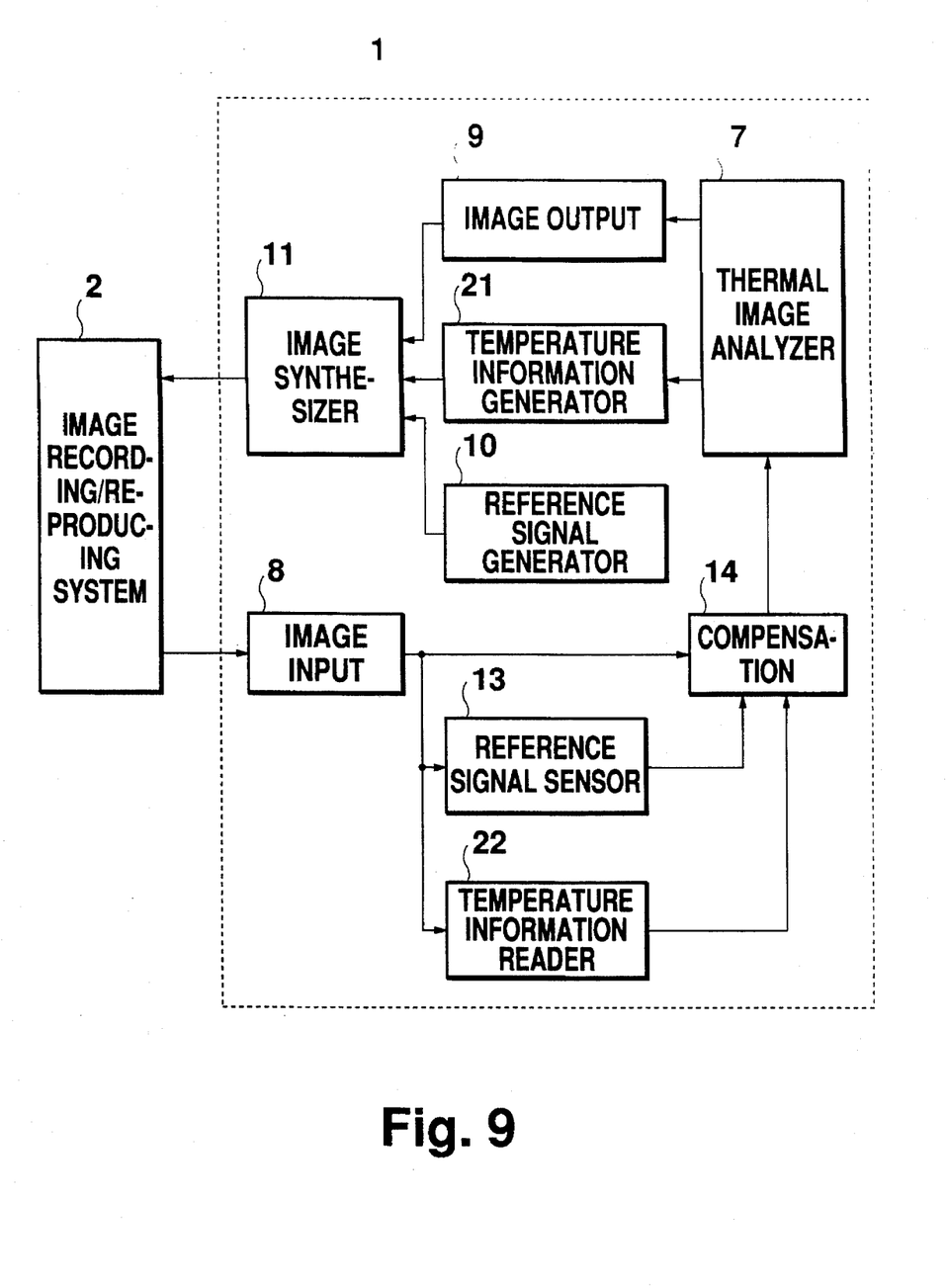
FIG. 9 is a block diagram of the fifth embodiment of a thermal image analysis system constructed in accordance with the present invention.
Figure 10A:
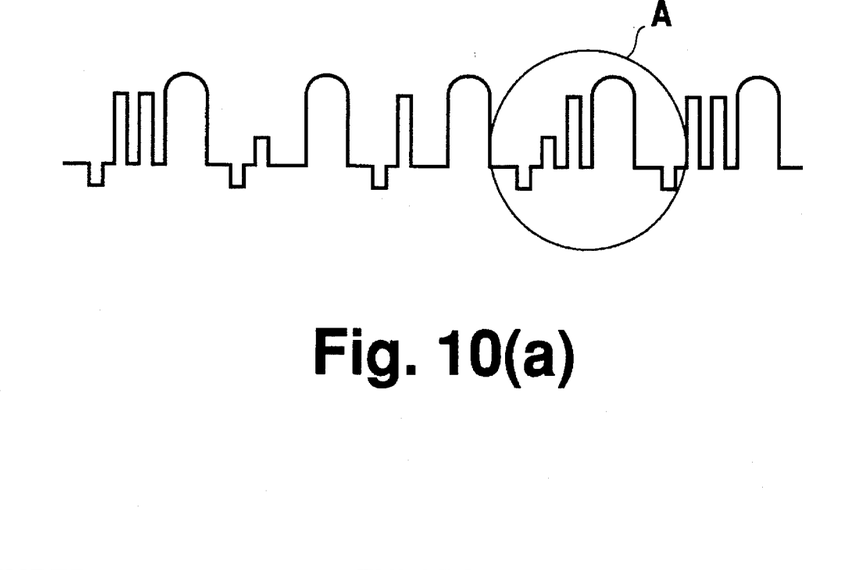
FIGS. 10(a) and (b) are waveforms illustrating the operation of the thermal image analysis system shown in FIG. 9.
Figure 10B:
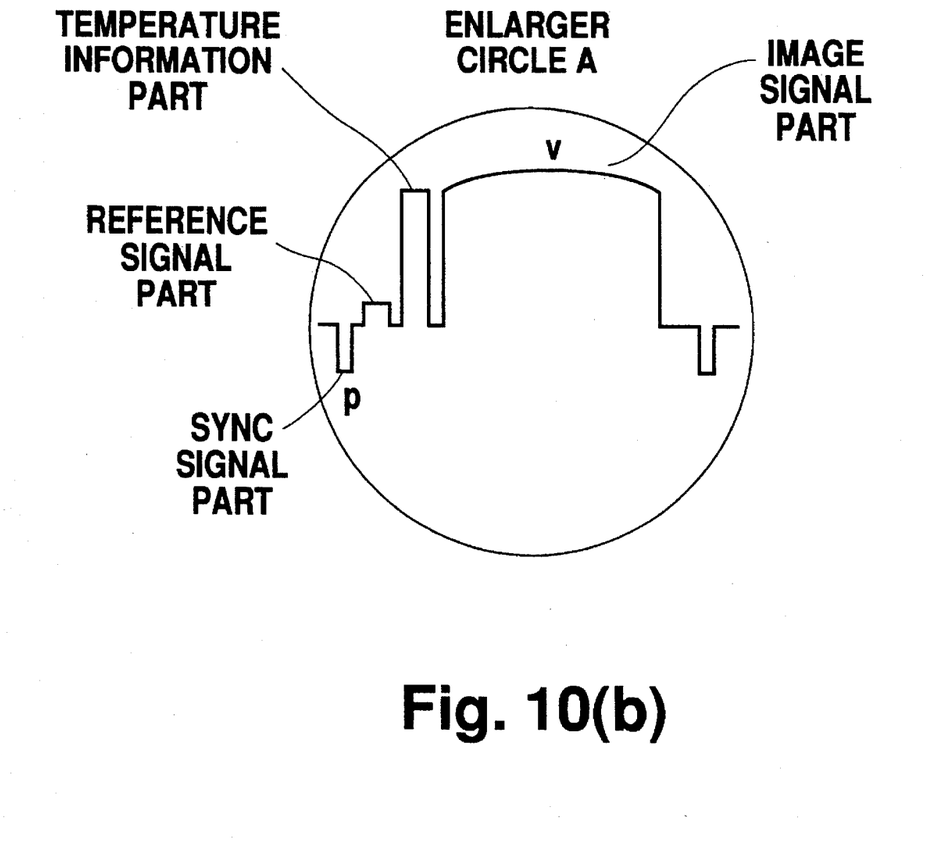

FIG. 9 shows a thermal image analysis system 1 constructed according to the fifth embodiment of the present invention and a image recording/reproducing system 2. The thermal image analysis system 1 comprises a temperature information generating circuit 21 and a temperature information reading circuit 22 which are added to the same structure as in the first embodiment. The numerical input circuit 12 is omitted. The temperature information generating circuit 21 codes the temperature information. The image synthesizing circuit 11 combines the coded temperature information with reference signals outputted from the reference signal generating circuit 10. As shown in FIGS. 10(a) and (b), the temperature information and reference signals are inserted into no-signal parts between sync signal parts p and image signal parts v in an image signal. The temperature information reading circuit 22 reads the temperature information inserted into the no-signal parts in the image signal. The read temperature information is then outputted toward the compensation circuit 14.

The thermal image analysis system 1 of the fifth embodiment can reliably read the information even if the image signal is degraded through the recording/reproducing process, since the coded information is inserted into each of the fields.

Embodiment 6

Figure 11:
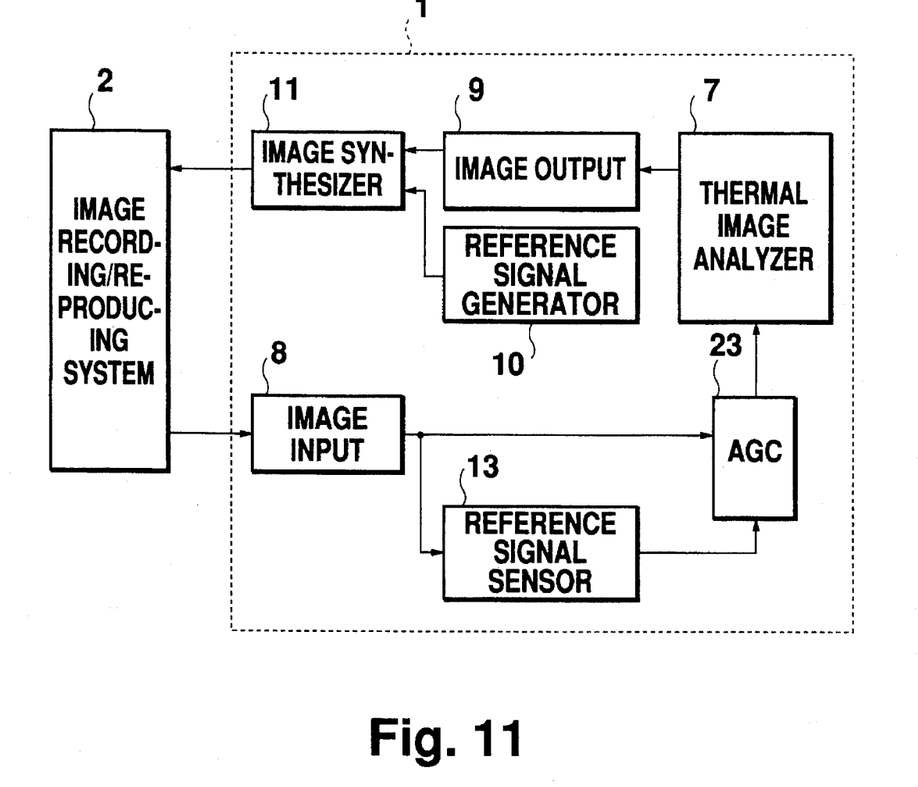
FIG. 11 is a block diagram of the sixth embodiment of a thermal image analysis system constructed in accordance with the present invention.
Figure 12:
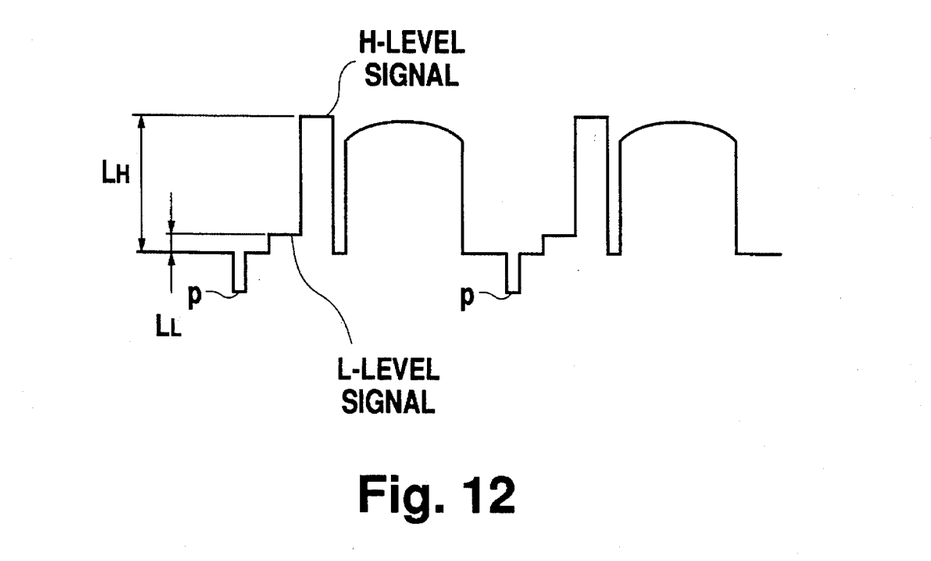
FIG. 12 is a waveform illustrating the operation of the thermal image analysis system shown in FIG. 11.

FIG. 11 shows a thermal image analysis system 1 constructed according to the sixth embodiment of the present invention and a image recording/reproducing system 2. The thermal image analysis system 1 of the sixth embodiment comprises an AGC circuit 23 added to the same structure as in the first embodiment, while the compensation circuit 14 is omitted. As shown in FIG. 12, the AGC circuit 23 may automatically compensate the image signal to substantially the same state before recorded by back-calculating the reference signals inserted into the no-signal parts between the sync signal parts p and the image signal parts v.

As shown in FIG. 12, for example, if an H-level signal is set at a value corresponding to a slightly high temperature within the range of measured temperature, while an L-level signal is fixed to a slightly low temperature within the range of measured temperature, the AGC circuit 23 automatically adjusts the image signal to a level wherein these two H- and L-level signals become constant. The automatically adjusted image signal is then outputted toward the thermal image analyzing unit 7 under such a condition that the relationship between the temperature and the image signal level is invariable at all times. In the thermal image analysis system 1 of the sixth embodiment, therefore, the numerical input circuit 12 can be omitted.

As described, the thermal image analysis system according to the present invention can perform the thermal image analysis with an increased accuracy since the image signal can be compensated even if it is degraded or changed by the image recording/reproducing system.

We claim:

1. A thermal image analysis system having an optical system for imaging an infrared image radiated from a surface of a subject, an image sensor for taking the infrared image imaged by said optical system, a thermal image analyzing unit for processing the infrared image taken by said image sensor to analyze temperature on the surface of the subject, an image output circuit for outputting a thermal image signal and an image input circuit for receiving a recorded and reproduced thermal image signal from an external image recording/reproducing system, said thermal image analysis system further comprising:

a reference signal generating circuit for generating a first set of two or more reference signals;

an image synthesizing circuit for combining the thermal image signal from said image output circuit with said first set of reference signals and outputting a synthesized waveform signal;

a reference signal sensing circuit for sensing a second set of two or more reference signals within the recorded and reproduced image signal inputted into said image input circuit;

a numerical input circuit for receiving temperature information corresponding to said second set of two or more reference signals; and a compensation circuit for compensating said recorded and reproduced image signal based on the temperature information inputted to said numerical input circuit and the second set of reference signals sensed from within the recorded and reproduced image signal by said reference signal sensing circuit.

2. A thermal image analysis system having an optical system for imaging an infrared image radiated from a surface of a subject, an image sensor for taking the infrared image imaged by said optical system, a thermal image analyzing unit for processing the infrared image taken by said image sensor to analyze temperature on the surface of the subject, image output circuit for outputting a thermal image signal and an image input circuit for receiving a recorded and reproduced thermal image signal from an external image recording/reproducing system, said thermal image analysis system further comprising:

a reference image generating circuit for generating a first set of two or more reference images;

an image switching circuit for selectively outputting the thermal image signal from said image output circuit or said first set of reference images generated by said reference image generating circuit;

a reference area cutting circuit for cutting a second set of two or more reference images from within the recorded and reproduced image signal inputted into said image input circuit;

a numerical input circuit for receiving temperature information corresponding to said second set of two or more reference images; and a compensation circuit for compensating said recorded and reproduced image signal inputted to said image input circuit based on the temperature information inputted to said numerical input circuit and the second set of reference images cut by said reference area cutting circuit.

3. A thermal image analysis system having an optical system for imaging an infrared image radiated from a surface of a subject, an image sensor for taking the infrared image imaged by said optical system, a thermal image analyzing unit for processing the infrared image taken by said image sensor to analyze temperature on the surface of the subject, an image output circuit for outputting a thermal image signal and an image input circuit for receiving a recorded and reproduced thermal image signal from an external image recording/reproducing system, said thermal image analysis system further comprising:

a reference image generating circuit for generating a first set of two or more reference images;

a display character generating circuit for generating a character image representing temperature information corresponding to said first set of reference images;

an image synthesizing circuit for combining the character image generated by said display character generating circuit with the first set of reference images generated by said reference image generating circuit and outputting a synthesized waveform signal;

an image switching circuit for selectively outputting the thermal image signal from said image output circuit or the synthesized waveform signal from said image synthesizing circuit;

a reference area cutting circuit for cutting a second set of two or more reference images from within the recorded and reproduced image signal inputted into said image input circuit;

a numerical input circuit for receiving temperature information corresponding to said second set of two or more reference images; and a compensation circuit for compensating the recorded and reproduced image signal inputted into the image input circuit based on said temperature information inputted to said numeric input circuit and the second set of reference images cut by said reference area cutting circuit.

4. A thermal image analysis system having an optical system for imaging an infrared image radiated from a surface of a subject, an image sensor for taking the infrared image imaged by said optical system, a thermal image analyzing unit for processing the infrared image taken by said image sensor to analyze temperature on the surface of the subject, an image output circuit for outputting a thermal image signal and an image input circuit for receiving a recorded and reproduced thermal image signal from an external image recording/reproducing system, said thermal image analysis system further comprising:

a reference image generating circuit for generating a first set of two or more reference images;

a bar code generating circuit for generating bar code images representing temperature information corresponding to said first set of reference images;

an image synthesizing circuit for combining said bar code images generated by said bar code generating circuit with the first set of reference images generated by said reference image generating circuit and outputting a synthesized waveform signal;

an image switching circuit for selectively outputting the thermal image signal from said image output circuit or the synthesized waveform signal from said image synthesizing circuit;

a reference area cutting circuit for cutting a second set of reference images from within the recorded and reproduced image signal inputted into said image input circuit;

a bar code reading circuit for reading the bar codes from within the recorded and reproduced image signal inputted into said image input circuit and decoding temperature information; and a compensation circuit for compensating the recorded and reproduced image signal inputted into the image input circuit based on the temperature information read out by said bar code reading circuit and the second set of reference images cut by said reference area cutting circuit.

5. A thermal image analysis system having an optical system for imaging an infrared image radiated from a surface of a subject, an image sensor for taking the infrared image imaged by said optical system, a thermal image analyzing unit for processing the infrared image taken by said image sensor to analyze temperature on the surface of the subject, an image output circuit for outputting a thermal image signal and an image input circuit for receiving a recorded and reproduced thermal image signal from an external image recording/reproducing system, said thermal image analysis system further comprising:

a reference signal generating circuit for generating a first set of two or more reference signals;

a temperature information generating circuit for generating temperature information corresponding to said first set of two or more reference signals;

an image synthesizing circuit for combining the thermal image signal from said image output circuit with the first set of reference signals generated by said reference signal generating circuit and the first temperature information generated by said temperature information generating circuit;

a reference signal sensing circuit for sensing a second set of reference signals from the recorded and reproduced image signal inputted to said image input circuit;

a temperature information reading circuit for reading second temperature information from within the recorded and reproduced image signal inputted into said image input circuit; and a compensation circuit for compensating the recorded and reproduced image signal inputted into said image input circuit based on the second temperature information read out by said temperature information reading circuit and the second set of reference signals sensed by said reference signal sensing circuit.

6. A thermal image analysis system having an optical system for imaging an infrared image radiated from a surface of a subject, an image sensor for taking the infrared image imaged by said optical system, a thermal image analyzing unit for processing the infrared image taken by said image sensor to analyze temperature on the surface of the subject, an image output circuit for outputting a thermal image signal and an image input circuit for receiving a recorded and reproduced thermal image signal from an external image recording/reproducing system, said thermal image analysis system further comprising:

a reference signal generating circuit for generating a first set of two or more reference signals;

an image synthesizing circuit for combining the thermal image signal from said image output circuit with the first set of reference signals generated by said reference signal generating circuit;

a reference signal sensing circuit for sensing a second set of two or more reference signals within the recorded and reproduced image signal inputted into said image input circuit; and an AGC circuit for equalizing a scale of the recorded and reproduced image signal inputted to the image input circuit based on the second set of reference signals sensed by said reference signal sensing circuit.

7. A thermal image analysis system as defined in any one of claims 1, 5 and 6 wherein the first set of reference signals generated, by said reference signal generating circuit are continuously variable.

8. A thermal image analysis system as defined in any one of claims 2, 3 and 4 wherein the first set of reference images generated by said reference image generating circuit are continuously variable.

9. A thermal image analysis system comprising:

a reference signal generating circuit which generates a first set of two or more reference signals;

an image synthesizing circuit which receives the first set of reference signals and a thermal image signal, the image synthesizing circuit combining the first set of reference signals with the thermal image signal to output a synthesized image signal;

a reference signal sensing circuit which receives a reproduced image signal and senses a second set of two or more reference signals within the received reproduced image signal;

a numerical input circuit which receives temperature information corresponding to each reference signal in the second set of reference signals; and a compensation circuit which receives the reproduced image signal, the second set of reference signals and the corresponding temperature information from the numerical input circuit and outputs a compensated reproduced image signal based on the second set of reference signals and the corresponding temperature information.

10. A thermal image analysis system as recited in claim 9, wherein:

the first set of reference signals consists of a first reference signal and a second reference signal; and the thermal image signal includes at least two no-signal parts; wherein
the first reference signal and the second reference signal are alternately inserted into the no-signal parts by the image synthesizing circuit.

11. A thermal image analysis system as recited in claim 9, wherein:

the first set of reference signals includes a first reference signal and a second reference signal; and the thermal image signal includes a no-signal part; wherein
the first reference signal and the second reference signal are inserted into the no-signal part by the image synthesizing circuit.

12. A thermal image analysis system comprising:

a reference image generating circuit which generates a reference image, said reference image including a first set of two or more reference image portions;

an image switching circuit which receives the reference image and a thermal image signal, the image switching circuit selectively outputting the reference image or the thermal image signal;

a reference area cutting circuit which receives a reproduced image signal and cuts a second set of two or more reference image portions within the received reproduced image signal;

a numerical input circuit which receives temperature information corresponding to each reference image portion in the second set of reference image portions; and a compensation circuit which receives the reproduced image signal, the second set of reference image portions and the corresponding temperature information from the numerical input circuit and outputs a compensated reproduced image signal based on the second set of reference image portions and the corresponding temperature information.

13. A thermal image analysis system as recited in claim 12, wherein:

the reference image consists of a bright image portion and a dark image portion.

14. A thermal image analysis system as recited in claim 12, wherein:

the reference image consists of a bright image portion, an intermediate image portion and a dark image portion.

15. A thermal image analysis system comprising:

a reference image generating circuit which generates a reference image, said reference image including a first set of two or more reference image portions;

a display character generating circuit which generates a character image representing temperature information corresponding to said first set of reference image portions;

an image synthesizing circuit which combines the character image generated by said display character generating circuit with the reference image generated by said reference image generating circuit and outputs a synthesized reference image signal wherein the character image is superimposed on the reference image;

an image switching circuit which receives the synthesized reference image signal and a thermal image signal, the image switching circuit selectively outputting the synthesized reference image signal or the thermal image signal;

a reference area cutting circuit which receives a reproduced image signal and cuts a second set of two or more reference image portions from within the received reproduced image signal;

a numerical input circuit which receives temperature information corresponding to each reference image portion in the second set of reference image portions; and a compensation circuit which receives the reproduced image signal, the second set of reference image portions and the temperature information from the numerical input circuit and outputs a compensated reproduced image signal based on the second set of reference image portions and the corresponding temperature information.

16. A thermal image analysis system as recited in claim 15, wherein:

the reference image consists of a bright image portion and a dark image portion.

17. A thermal image analysis system as recited in claim 15, wherein:

the reference image consists of a bright image portion, an intermediate image portion and a dark image portion.

18. A thermal image analysis system comprising:

a reference image generating circuit which generates a reference image, said reference image including a first set of two or more reference image portions;

a bar code generating circuit which generates bar code images representing temperature information corresponding to said first set of two or more reference image portions;

an image synthesizing circuit which combines the bar code images generated by said bar code generating circuit with the reference image generated by said reference image generating circuit and outputs a synthesized reference image signal wherein the bar code image is superimposed on the reference image;

an image switching circuit which receives the synthesized reference image signal and a thermal image signal, the image switching circuit selectively outputting the synthesized reference image signal or the thermal image signal;

a reference area cutting circuit which receives a reproduced image signal and cuts a second set of two or more reference image portions from the received reproduced image signal;

a bar code reading circuit for reading bar codes within the received reproduced image signal and outputting temperature information corresponding to the second set of reference image portions; and a compensation circuit which receives the reproduced image signal, the second set of reference image portions and the corresponding temperature information from the bar code reading circuit and outputs a compensated reproduced image signal based on the second set of reference image portions and the corresponding temperature information.

19. A thermal image analysis system as recited in claim 18, wherein:

the reference image consists of a bright image portion and a dark image portion.

20. A thermal image analysis system as recited in claim 18, wherein:

the reference image consists of a bright image portion, an intermediate image portion and a dark image portion.

21. A thermal image analysis system comprising:

a reference signal generating circuit which generates a first set of two or more reference signals;

a temperature information generating circuit which generates coded temperature information corresponding to said first set of two or more reference signals;

an image synthesizing circuit which receives the first set of reference signals, a thermal image signal, and the coded temperature information, the image synthesizing circuit combining the set of reference signals and the coded temperature information with the thermal image signal to output a synthesized image signal;

a reference signal sensing circuit which receives a reproduced image signal and senses a second set of two or more reference signals within the received reproduced image signal;

a temperature information reading circuit which reads coded temperature information from within the reproduced image signal and outputs temperature information corresponding to the second set of reference signals; and a compensation circuit which receives the reproduced image signal, the second set of reference signals and the corresponding temperature information from the temperature information reading circuit and outputs a compensated reproduced image signal based on the second set of reference signals and the corresponding temperature information.

22. A thermal image analysis system as recited in claim 21, wherein:

the first set of reference signals consists of a first reference signal and a second reference signal; and the thermal image signal includes a first no-signal part, and a next no signal part; wherein
the first reference signal and corresponding coded temperature information are inserted into the first no-signal part and the second reference signal and corresponding coded temperature information are inserted into the next no signal part by the image synthesizing circuit.

23. A thermal image analysis system as recited in claim 21, wherein:

the first set of reference signals consists of a first reference signal and a second reference signal; and the thermal image signal includes a no-signal part, wherein
the first reference signal and corresponding coded temperature information and the second reference signal and corresponding coded temperature information are inserted into the no signal part by the image synthesizing circuit.

24. A thermal image analysis system comprising:

a reference signal generating circuit which generates a first set of two or more reference signals;

an image synthesizing circuit which receives the first set of reference signals and a thermal image signal, the image synthesizing circuit combining the set of reference signals with the thermal image signal to output a synthesized image signal;

a reference signal sensing circuit which receives a reproduced image signal and senses a second set of two or more reference signals within the received reproduced image signal; and an AGC circuit for equalizing a scale of the reproduced image signal based on the second set of reference signals sensed by said reference signal sensing circuit.

25. A thermal image analysis system as recited in claim 24, wherein:

the first set of reference signals consists of a first reference signal and a second reference signal; and the thermal image signal includes at least two no-signal parts; wherein
the first reference signal and the second reference signal are alternately inserted into the no-signal part by the image synthesizing circuit.

26. A thermal image analysis system as recited in claim 24, wherein:

the first set of reference signals includes a first reference signal and a second reference signal; and the thermal image signal includes a no-signal part; wherein
the first reference signal and the second reference signal are inserted into a same no-signal part by the image synthesizing circuit.

\* \* \* \* \*